Feb. 5, 1952  W. M. PRESTON  2,584,399
ROTATABLE WAVE GUIDE JOINT
Filed Aug. 11, 1945

INVENTOR
WILLIAM M. PRESTON
BY Ralph L. Chappell
ATTORNEY

Patented Feb. 5, 1952

2,584,399

UNITED STATES PATENT OFFICE 2,584,399

ROTATABLE WAVE GUIDE JOINT

William M. Preston, Lincoln, Mass., assignor, by mesne assignments, to the United States of America as represented by the Secretary of the Navy Application August 11, 1945, Serial No. 610,350

15 Claims. (Cl. 178—44)

This invention relates to the guided transmission of electric waves, and more particularly to rotatable joints for high frequency transmission line systems.

The subject matter of the present invention is shown and described in the copending application of Shepard Roberts, S. N. 510,990, filed Nov. 19, 1943, for Rotatable Joints for Wave Guide Systems, and in my copending application, executed June 18, 1945, S. N. 617,134, filed September 18, 1945, for Mode Filter. My present invention is an improvement in the rotatable joints claimed in the application of Shepard Roberts.

When it is sought to carry high frequency electric waves to or from a rotatable structure, a rotatable joint is desirable in the transmission line system. Such a joint is most easily made with a pair of coaxially abutted cylindrical wave guide sections arranged to be excited in a mode having symmetry about their longitudinal axis. The wave guide sections are arranged to be mutually rotatable about the common axis. It is necessary to provide a means of transforming energy entering the joint from the transmission line into a mode of axial symmetry, and upon leaving the joint, into a mode suitable for passage through the output transmission line. Therefore each cylindrical wave guide section is provided with a mode transformer at the input or output end thereof. These mode transformers function equally well in either direction and either end of a rotatable joint made with them may be used as the input or output end.

The mode of oscillation that has been found to be desirable for use in the cylindrical wave guide sections of a rotatable joint is that mode having its magnetic lines of force lying wholly transverse to the longitudinal axis of the wave guide, namely the $TM_{01}$ mode. However, the internal diameter that will permit this mode of oscillation to be transmitted at the desired frequency of operation unfortunately also permits the $TE_{11}$ mode of oscillation to exist. This is a mode that is not axially symmetrical, and its presence causes the rotatable joint to be frequency sensitive and to waste power. The $TE_{11}$ mode of oscillation may also cause the joint to behave erratically as it is rotated.

In a well designed mode transformer, the $TE_{11}$ mode of oscillation is suppressed. Suppression takes the form of apparatus provided in the mode transformer at the junction of the cylindrical wave guide and the transmission line system to present a relatively high impedance to the $TE_{11}$ mode at that junction. At the same time a relatively low impedance is presented to the $TM_{01}$ mode, and that mode is passed through the rotatable joint, from one mode transformer to its companion mode transformer.

The junction between the transmission line and a cylindrical wave guide section is actually not a point, but rather a region having finite limits. This region will herein be referred to as a point of junction, nevertheless. As a consequence, the input impedance of a mode transformer for the $TE_{11}$ mode will remain finite, no matter how high that impedance is made to be. As a further consequence, when two transformer units are jointed at their cylindrical ends to make a rotatable joint, the round pipe, or cylindrical wave guide section of the joint will resonate to the $TE_{11}$ mode for certain critical spacings between the hereinabove mentioned points of junction of the two mode transformers. The Q of this resonance is high, so that the input impedance varies rapidly with frequency and large transmission losses take place. The entire rotatable joint therefore becomes sensitive to frequency changes, and operates well only over a relatively narrow band of frequencies, unless retuned with each slight change of frequency.

Another difficulty results from resonance to the $TE_{11}$ mode. In a commonly used and highly desirable form of rotatable joint that is arranged for use in a rectangular wave guide transmission line system, the transmission line is brought directly into a side of each cylindrical wave guide section. In this form of joint, there is a lack of symmetry in each mode transformer section, and the initial phase of a $TE_{11}$ mode wave will vary with its plane of polarization. This in turn is a function of the angle between the input and output rectangular wave guide sections. As a consequence, changes in input impedance of the rotatable joint will occur as the joint is rotated, resulting in erratic performance. As in the case of the undesirable resonance hereinabove mentioned, the spacings between the two points of junction hereinabove defined can be adjusted to minimize this defect also.

It is accordingly an object of my invention to provide a rotatable joint for transmission line systems in which the cylindrical section is adjustable in length.

It is another object of my invention to provide coupling apparatus for the cylindrical sections of such a joint that will make it possible to vary the over-all length of the cylindrical portion of the joint without altering the spacing between the abutting faces of those sections.

It is a further object of my invention to provide such a coupling that will permit free relative rotation of the two cylindrical sections on their common axis.

It is a still further object of my invention to provide such a coupling that will be simple to adjust and remain fixed in adjustment.

It is still another object of my invention to provide such a coupling that will permit a relatively smooth flow of power from one cylindrical wave guide section to the other.

Other objects and features of my invention will become apparent upon a careful consideration of the following detailed description when taken together with the accompanying drawings, the figures of which illustrate typical embodiments of the invention.

Figure 1:
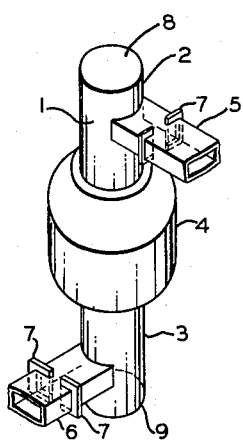
Fig. 1 illustrates a rotatable joint embodying my invention.

Referring now to Fig. 1, a rotatable joint 1, is made up of two coaxial abutting cylindrical wave guide sections 2 and 3, and coupling apparatus 4 for said sections 2 and 3. The joint 1 is inserted in a rectangular transmission line system of which only the two ends 5 and 6 are shown. Impedance matching diaphragms 7 are provided in pairs in the rectangular wave guides 5 and 6 to effect a smooth and efficient flow of power between the joint 1 and the transmission line ends 5 and 6. The length of the cylindrical portion of the joint 1 may be adjusted by mechanism contained within the coupling apparatus 4 (not shown in Fig. 1). Each cylindrical wave guide section 2 and 3 is provided with an outer end closure 8 and 9, respectively. The cylindrical sections 2 and 3 are capable of relative rotation on their common axis, and therefore each part 5 or 6 of the transmission line system is capable of rotation about the same axis with respect to the other part. Anti-friction devices (not shown in Fig. 1), contained within the coupling apparatus 4, facilitate relatively free rotation of one cylindrical section 2 or 3 with respect to the other. Devices of the sort that may be contained within the coupling apparatus 4 are shown in the embodiments of Figs. 2 and 3, and will be explained hereinbelow in connection with those figures.

Figure 2:
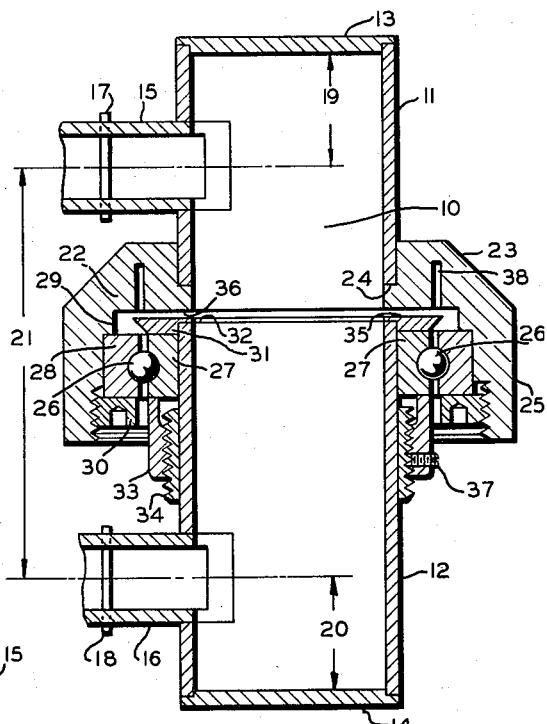
Fig. 2 is a cross section of the joint of Fig. 1, illustrating my invention, the lower portion of the joint being rotated from its position in Fig. 1 to vertically align the entering and leaving wave guides.
Figure 3:
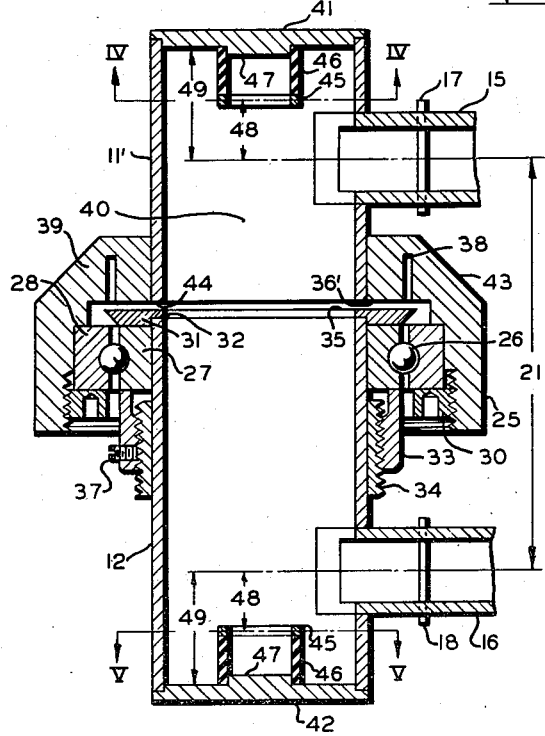
Fig. 3 is a cross section of another illustrating another embodiment of my invention.

In Fig. 2, a rotatable joint 10, corresponding to the joint 1 of Fig. 1, is made up of two coaxial abutting cylindrical wave guide sections 11 and 12, having end closures 13 and 14, respectively. The joint 10 is shown inserted in a rectangular wave guide system of which the adjoining ends 15 and 16 are shown. Impedance matching diaphragms 17 and 18 are provided, similar to the diaphragms 7 of Fig. 1. These diaphragms 17 and 18 may be used singly or in pairs, as desired, and are preferably soldered into place at any desired penetration into the respective wave guides desired penetration into the respective ave guides 15 and 16. The center line of each rectangular wave guide end 15 or 16 is spaced a distance 19 or 20 respectively from the nearest end closure 13 or 14 that is preferably substantially equal to one-quarter of the length of a wave of energy in the TE₁₁ mode of oscillation at the midpoint of the operating frequency band. The distance 19 or 20 may be any odd number of these aforementioned quarter-wave lengths, as desired. The distance 21 between the center lines of the two rectangular wave guide ends 15 and 16 is adjustable by apparatus contained within the coupling mechanism 22.

The coupling mechanism 22 is made up of an upper sleeve 23 that is affixed to the upper cylindrical wave guide section 11 and is in electrical contact therewith. This sleeve 23 is shaped to form a seat 24 for the upper cylindrical section 11, and is further widened and shaped to form a lower enlarged sleeve 25 overlapping the lower cylindrical section 12 and containing therein other hereinbelow described devices for the positioning and holding of the two cylindrical sections 11 and 12. An anti-friction device comprising ball bearings 26 and inner and outer bearing races 27 and 28 respectively is provided to permit free relative rotation of the upper and lower cylindrical sections 11 and 12 on their common axis. The outer bearing race 28 is fixedly clamped in the overlapping sleeve 25 against a seat 29 by a threaded ring 30. A metallic annulus 31 is firmly affixed to the upper side of the inner bearing race 27, and overlaps the upper cross sectional face 32 of the lower cylindrical section 12. A first threaded collar 33 is firmly affixed to the lower side of the inner bearing race 27, and cooperates with a second threaded collar 34 which is firmly affixed to the lower cylindrical section 12. The inner bearing race 27 has an internal diameter that is substantially equal to or slightly larger than the outer diameter of the lower cylindrical section 12. When the lower cylindrical section 12 is rotated with respect to the inner bearing race 27, the lower section 12 moves axially with respect to the bearing races 27 and 28, and with respect to the annulus 31 and the upper cylindrical section 11 thus varying the distance 21 between the centers of the rectangular wave guide ends 15 and 16. The spacing between the adjacent faces 35 and 36 of the annulus 31 and the upper sleeve 23 is maintained fixed during this operation. A locking screw 37 may be provided in the first threaded collar 33, if desired, to hold the lower cylindrical section 12 from moving axially once it has been adjusted.

A slot 38 is cut in the upper sleeve 23, to a depth substantially equal to one quarter of a free-space wave length of energy at the midpoint of the operating frequency band. This slot 38 is spaced outwardly from the inner face of the cylindrical part of the rotating joint 10 by a distance substantially equal to said quarter wave length. In a known manner, this arrangement, comprising the slot 38 and the space between the adjacent or abutting faces 35 and 36 provides an electrical short circuit across the gap defined by the abutting faces 35 and 36 for energy being transmitted from one cylindrical section 11 or 12 to the other.

The apparatus illustrated in Fig. 2 operates as follows. Energy at the operative frequency in the TE₁₀ mode is present in the rectangular wave guide system. This mode has its electric vector transverse to the axis of the rectangular wave guide, here vertical with respect to the drawing in rectangular wave guide ends 15 and 16. This energy generates waves in the TM₀₁ and the TE₁₁ modes upon entering a cylindrical wave guide section, and thus there is mode transformation. It will be assumed that the upper cylindrical section 11 is in the input end of the joint 10, although it is to be understood that the joint 10 will function to carry energy in either direction. Either end of the joint 10 may be considered to be a mode transformer, and each functions in the same manner to pass energy either way. The distance 19 between the center line of the input wave guide 15 and the end closure 13 is as hereinabove mentioned, substantially equal to one quarter of the length of a wave, in the cylindrical wave guide, of energy at the mid operating frequency in the $TE_{11}$ mode. In a known and usual manner, then, $TE_{11}$ mode energy reflected from the end closure 13 will arrive at the point of junction of the two wave guides 15 and 11 180 degrees out of phase with $TE_{11}$ energy that is proceeding down the cylindrical wave guide 11 from the said junction. This phase difference will result in substantial cancellation of the $TE_{11}$ mode, which is equivalent to saying that the input impedance to the $TE_{11}$ mode is made relatively high. Simultaneously, the $TM_{01}$ mode is not cancelled, for the length of a wave in the $TM_{01}$ mode is different from that of a wave in the $TE_{11}$ mode at the same frequency. However, the wave lengths of each mode are of the same order of magnitude so that in the process of substantially cancelling out the $TE_{11}$ mode waves, a certain degree of mismatch between the rectangular wave guide 15 and the cylindrical wave guide 11 is experienced for the $TM_{01}$ mode. This mismatch is corrected by the diaphragms 17, which introduce an inductive shunt susceptance into the mode transformer. As hereinabove stated, the diaphragms 17 are preferably soldered into place at any desired penetration into the wave guide 15. The depth of penetration determines the amount of susceptance introduced into the transformer, and is preferably adjusted to provide a smooth flow of power in the $TM_{01}$ mode.

The mode transformer hereinabove described thus provides a relatively low input impedance to the desired $TM_{01}$ mode of oscillation, and desirably the highest possible input impedance to the undesired $TE_{11}$ mode. As hereinabove stated, either end of the joint 10 may be considered to be an identical mode transformer, so that the lower end of the joint 10 may be regarded as an identical companion to the upper end. Further, as hereinabove explained, the input impedance of either transformer to the $TE_{11}$ mode is at all times finite, no matter how great, and resonance to this mode will take place in the cylindrical cavity made up of the cylindrical wave guide sections 11 and 12 for certain critical lengths of that cavity. If we consider the hereinabove defined junction point of each mode transformer to lie on the center line of the thereunto attached rectangular wave guide end 15 or 16, the distance 21 between center lines is the distance between said junction points.

I have found that resonance to the $TE_{11}$ mode will occur in the cylindrical cavity made up of the two abutting wave guide sections 11 and 12 when the distance 21 between the two transformer junction points is approximately $$\frac{n}{2}\lambda$$

Where:

"$n$" is a whole number, and
"$\lambda$" is the wave length in the cylindrical wave guide of energy at the operative frequency in the $TE_{11}$ mode.

When the distance 21 between the transformer junction points is made to lie between two adjacent values that cause $TE_{11}$ resonance, this resonance will be greatly minimized. Variations in the input impedance of the joint 10 as the angle between the two wave guide ends 15 and 16 changes will be greatly minimized, and frequency sensitivity of the joint 10 will be greatly reduced. The ability of the joint 10 to operate efficiently over a wide band of frequencies will be improved. However, values of "$n$" in excess of "22" are to be avoided, as distances 21 between transformer junction points corresponding to that value introduce resonances to the $TE_{11}$ mode that overlap at the ends of the operating frequency band of the joint. Elimination of $TE_{11}$ mode resonance is then relatively impossible. As hereinabove explained, the distance 21 between transformer junction points may be adjusted by rotating the lower cylindrical wave guide section 12 with respect to the inner bearing race 27 and the thereunto attached outer collar 33.

In Fig. 3 there is illustrated a modification of my invention showing a slightly altered coupling of my invention with a pair of mode transformers of another sort to provide a rotatable joint. Parts and dimensions that are identical in Figs. 2 and 3 are given the same reference characters in both figures. The rotatable joint 40 is made up of two cylindrical wave guide sections 11' and 12 closed by two end closures 41 and 42 respectively and joined together by a coupling mechanism 39. The joint 40 is shown installed in a rectangular wave guide transmission line represented by the attached ends 15 and 16, having impedance matching diaphragms 17 and 18, all substantially as in Fig. 2. The coupling 39 differs from the coupling 22 of Fig. 2 only in that the upper sleeve 43 of the former coupling 39 is bored completely through so that the upper cylindrical wave guide 11' extends completely therethrough. The inner cross-sectional face 44 of the upper cylindrical wave guide 11' is flush with the inner face 36' of the upper sleeve 43. These two faces 44 and 36' together act in the same manner as the corresponding face 36 of the apparatus of Fig. 2. In other respects the two couplings 39 and 22 are identical and function in the same manner both electrically and mechanically.

Figure 4:
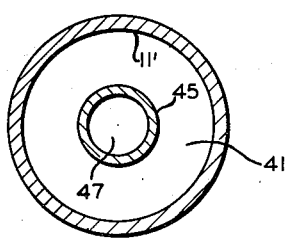
Fig. 4 is a cross section along line IV—IV of Fig. 3.

The mode transformers shown in the apparatus of Fig. 3 each include a somewhat more highly refined mode cancelling and reenforcing system. A metallic annulus 45 is positioned coaxially within each cylindrical section near the closed end 41 or 42 thereof, and spaced from the end 41 or 42 by a non-conducting cylinder 46, which may be made of polystyrene or like insulating material. Fig. 4, a cross-section along line IV—IV of Fig. 3, shows an annulus 45 in position in the upper transformer. An identical cross section would be had along the line V—V in Fig. 3, showing an annulus 45 in position in the lower transformer. The non-conducting cylinder 46 is supported upon a raised portion 47 of the end closure 41 or 42, and is preferably cemented thereto. The annulus 45 is preferably cemented to the supporting cylinder 46. Each metallic annulus 45 lies in a plane that is substantially transverse to the axis of the cylindrical guide section 11' or 12 in which it is mounted, and is spaced a distance 48 from its transformer junction point preferably substantially equal to one quarter of the length of a wave in the $TE_{11}$ mode of oscillation at the mid operative frequency, although this distance 48 may be any odd number of such quarter wave lengths, as desired. Each end closure 41 or 42 is spaced a distance 49 from its transformer junction point preferably substantially equal to one-half the length of a wave in the TM$_{01}$ mode of oscillation at the mid operative frequency. This distance 49 may be any integral number of such half wave lengths, as desired.

Each transformer in the apparatus of Fig. 3 operates in exactly the same manner. An explanation of the manner in which the upper part of the rotatable joint 40 operates will therefore serve to explain how either part operates. As in the apparatus of Fig. 2, it is to be understood that the mode transformers are operable in either direction. It will here be assumed, for the sake of explanation, that the wave guide end 15 is delivering energy in the TE$_{10}$ mode for rectangular wave guides to the cylindrical wave guide 11'. In the cylindrical wave guide 11' this delivered energy excites waves in the TM$_{01}$ and TE$_{11}$ modes for cylindrical wave guides. As explained in my aforesaid copending application S. N. 617,134, filed September 18, 1945, for Mode Filters, the annulus 45 reflects the TE$_{11}$ mode, but does not affect the TM$_{01}$ mode. Because of the spacing 48 between the annulus 45 and the point of junction of the wave guide 11' and 15, the input impedance to the TE$_{11}$ mode is relatively very high, the theory of this action being identical to that on which the explanation of substantial cancellation of the TE$_{11}$ mode in the apparatus of Fig. 2 is based. The end closure 41 however is spaced such a distance 49 from the aforesaid junction point as will cause reflected waves in the TM$_{01}$ to reenforce similar waves proceeding down the cylindrical wave guide 11' from the junction point, thereby increasing the strength of these TM$_{01}$ waves. The diaphragms 17 again introduce shunt susceptance as desired to effect the smooth flow of energy in the TM$_{01}$ mode through the joint 40.

As in the apparatus of Fig. 2, the cylindrical cavity made up of the two wave guide sections 11' and 12 will resonate to the TE$_{11}$ mode if the distance 21 between junction points is of a value equal approximately to $$\frac{n}{2}\lambda$$

where "$n$" and "$\lambda$" have the same meanings as stated hereinabove. The coupling of the apparatus of Fig. 3 is operable in the same way as that of Fig. 2 to adjust the distance 21 between junction points to restrain resonating of the TE$_{11}$ mode, and the same considerations as to preferred adjustments apply as in the apparatus of Fig. 2.

Although I have shown and described only certain specific embodiments of my invention, I am fully aware of the many modifications possible thereof. Therefore this invention is not to be limited except insofar as is necessitated by the prior art and spirit of the appended claims.

I claim:

1. In a rectangular wave guide system adapted to carry electrical energy in either direction in the TE$_{10}$ mode of oscillation, a rotatable joint comprising two substantially abutting coaxial sections of wave guide, means for transforming said TE$_{10}$ mode energy entering said joint at either end thereof from said rectangular wave guide to the TM$_{01}$ and TE$_{11}$ modes for cylindrical wave guides, means at each end of said joint for presenting a relatively high impedance to said TE$_{11}$ mode at the points of entry of said TE$_{11}$ mode energy into said joint, and means for adjusting one of said cylindrical sections axially in position with respect to the other of said sections, said sections being adjusted to a selected one of a plurality of relative axial positions at any one of which resonance in said coaxial sections of wave guide to said TE$_{11}$ mode is inhibited.

2. A rotatable joint for transmission line systems comprising two substantially abutting coaxially aligned sections of cylindrical wave guide, each of said sections being adapted to accept electrical energy from a transmission line at a point near the outer end of said section, and to transform said energy into one or more modes of oscillation for cylindrical wave guides, means including anti-friction bearings for holding said sections in fixed axial spacing at their effective abutting ends while simultaneously permitting relative rotation between said sections on the common axis, and means for adjusting the position of one of said sections axially with respect to said holding means, said one section and said holding means being adjusted to a selected one of a number of relative axial positions at any one of which resonance in said sections of cylindrical wave guide to one of said modes is inhibited.

3. A rotatable joint for transmission line systems comprising two substantially abutting coaxially aligned sections of cylindrical wave guide, each of said sections being adapted to accept electrical energy from a transmission line at a point near the outer end of said section, and to transform said energy into one or more modes of oscillation for cylindrical wave guides, a metallic annulus having a portion thereof positioned coaxially between the inner contiguous ends of said sections and another portion telescopically fitted about and electrically connected to one of said sections, means including anti-friction bearings for holding said sections and said annulus in predetermined axial spacing while simultaneously permitting relative rotation between said sections on the common axis, and means for adjusting the position of the section that is connected to said annulus axially with respect to said annulus and said other section, said section connected to said annulus being adjusted to a selected one of a number of axial positions with respect to said annulus and said other section at any one of which resonance within said sections of cylindrical wave guide to one of said modes of oscillation is inhibited.

4. Apparatus for the guided transmission of electric waves comprising first and second coaxially aligned substantially abutting cylindrical wave guides, each of said guides being adapted to accept electrical energy from a transmission line at a point near the outer end of said section, and to transform said energy into one or more modes of oscillation for cylindrical wave guides, a metallic annulus of substantially the same inner diameter as said wave guides having one portion positioned coaxially between the adjacent ends of said wave guides and another portion telescoped in electrical contact about the last named end of said first wave guide, means for holding said wave guides and said annulus in predetermined axial spacing while simultaneously permitting relative rotation of between said first wave guide and said telescoped annulus together, on the common axis with respect to said second wave guide, and means for adjusting the position of said first wave guide axially with respect to said annulus and said second wave guide, said first wave guide being adjusted to a selected one of a plurality of axial positions with respect to said annulus and said second wave guide at any one of which resonance within said abutting cylindrical wave guides to one of said modes of oscillation is inhibited.

5. Apparatus for the guided transmission of electric waves of a predetermined band of frequencies comprising first and second coaxially aligned cylindrical wave guides having substantially abutting ends, structural means cooperating with each of said wave guides and positioned at the abutment thereof for holding said wave guides in predetermined axial relation and simultaneously permitting relative rotation of said wave guides about the common axis, said means including a first metallic sleeve of greater diameter than said wave guides conductively secured to the second of said wave guides and extended parallel thereto and overlapping said abutment, a second metallic sleeve of lesser diameter than said first sleeve but of substantially the same diameter as said wave guides slidably secured to said first wave guide and positioned within said first sleeve, a metallic annulus fixed to said second sleeve and overlapping said abutting end of said first wave guides, anti-friction bearings positioned between said sleeves, said sleeves and bearings cooperating to provide a fixed annular gap between said abutting end of said second wave guide and said annulus, an annular cavity in said first sleeve coaxial with and substantially parallel to said wave guides of depth substantially equal to one-quarter of a free-space electrical wave length measured at the intermediate operative frequency of said wave guide sections and positioned a distance from the wall of said second wave guide substantially equal to said quarter wave length, said cavity and said fixed annular gap cooperating to provide substantially an electrical short circuit across said gap for waves in said operative frequency band, and means for adjusting the axial position of said first wave guide with respect to said second sleeve and said second wave guide, said first wave guide being adjusted to a selected one of a plurality of axial positions relative to said second sleeve and said second wave guide at any one of which resonance within said cylindrical wave guides to at least one mode of oscillation within said band of frequencies is inhibited.

6. In a rectangular wave guide system adapted to carry electrical energy in either direction in the $TE_{10}$ mode of oscillation, a rotatable joint comprising first and second coaxially aligned cylindrical wave guides having substantially abutting ends, means for coupling a section of said rectangular guide to each of said cylindrical wave guides at the sides thereof, means for transforming said $TE_{10}$ mode energy entering said joint at either cylindrical guide to the $TM_{01}$ mode for said cylindrical wave guides, a closure at the end of each cylindrical guide opposite the abutting end spaced from the coupling point an odd number of quarter wave lengths of energy in the $TE_{11}$ mode for said cylindrical guides, structural means cooperating with each of said wave guides and positioned at the abutment thereof for holding said wave guides in predetermined axial relation and simultaneously permitting relative rotation of said wave guides about the common axis, said structural means including a first metallic sleeve of greater diameter than said wave guides conductively secured to the second of said wave guides and extended parallel thereto and overlapping said abutment, a second metallic sleeve of lesser diameter than said first sleeve and of substantially the same diameter as said wave guides slidably secured to said first wave guide and positioned within said first sleeve, a metallic annulus fixed to said second sleeve and overlapping said abutting end of said first wave guide, anti-friction bearings positioned between said sleeves, said sleeves and bearings cooperating to provide a fixed annular gap between said abutting end of said second wave guide and said annulus, said first sleeve being formed with an annular cavity coaxial with and substantially parallel to said wave guides of depth substantially equal to one-quarter of a free-space electrical wave length measured at the intermediate operative frequency of said wave guide sections and positioned a distance from the wall of said second wave guide substantially equal to said quarter wave length, said cavity and said fixed annular gap cooperating to provide substantially an electrical short circuit across said gap for waves in said operative frequency band, and means for adjusting the axial position of said first wave guide with respect to said second sleeve and said second wave guide, said first wave guide being adjusted to a selected one of a plurality of axial positions relative to said second sleeve and said second wave guide, at any one of which positions resonance in said cylindrical guides to said $TE_{11}$ mode oscillation at the operative frequency is inhibited.

7. In a rectangular wave guide system adapted to carry electrical energy in either direction in the $TE_{10}$ mode of oscillation, a rotatable joint comprising first and second coaxially aligned cylindrical wave guides having substantially abutting ends, means for coupling a section of said rectangular guide to each of said cylindrical guides at the sides thereof, means for transforming said $TE_{10}$ mode energy entering said joint at either cylindrical wave guide to the $TM_{01}$ mode for said cylindrical guides, a closure at the end of each cylindrical guide opposite the abutting end spaced from the coupling point of said $TM_{01}$ mode energy an intergal number of half-wave lengths of said $TM_{01}$ mode energy, a metallic annulus disposed coaxially within each of said cylindrical wave guides an odd number of quarter-wave lengths of energy in the $TE_{11}$ mode from said coupling point in the direction of said closure, structural means cooperating with each of said wave guides and positioned at the abutment thereof for holding said wave guides in predetermined axial relation and simultaneously permitting relative rotation of said wave guides about the common axis, said structural means including a first metallic sleeve of greater diameter than said wave guides mechanically and conductively secured to the second of said wave guides and extending parallel thereto and overlapping said abutment, a second metallic sleeve of lesser diameter than said first sleeve and of substantially the same diameter as said wave guides slidably secured to said first wave guide and positioned within said first sleeve, a metallic annulus fixed to said second sleeve and overlapping said abutting end of said first wave guide, anti-friction bearings positioned between said sleeves, said sleeves and bearings cooperating to provide a fixed annular gap between said abutting end of said second wave guide and said annulus, said first sleeve being formed with an annular cavity coaxial with and substantially parallel to said wave guides of depth substantially equal to one-quarter of a free-space electrical wave length measured at the intermediate operative frequency of said wave guide sections and positioned a distance from the wall of said second wave guide substantially equal to said quarter wave length, said cavity and said fixed annular gap cooperating to provide substantially an electrical short circuit across said gap for waves in said operative frequency band, and means for adjusting the axial position of said first wave guide with respect to said second sleeve and said second wave guide, said first wave guide being adjusted to a selected one of a plurality of axial positions with respect to said second sleeve and said second wave guide at any one of which resonance in said cylindrical guides to said $TE_{11}$ mode of oscillation at the operative frequency is inhibited.

8. A joint comprising two substantially abutting coaxial sections of wave guides, each of said sections being adapted to accept electrical energy at a point therein and to transform said energy into one or more modes of oscillation that may be propagated in said sections of wave guide, means for adjusting one of said sections axially in position with respect to the other of said sections, said sections being adjusted to a selected one of a plurality of relative axial positions at any one of which resonance in said abutting sections to at least one of said modes is inhibited.

9. A joint for transmission line systems comprising two substantially abutting coaxially aligned sections of cylindrical wave guide, each of said sections being adapted to accept electrical energy from a transmission line at a point near the outer end of said section, and to transform said energy into one or more modes of oscillation that may be propagated in said wave guide, means for holding said sections in fixed axial spacing at their effective abutting ends, and means for adjusting the position of one of said sections axially with respect to said holding means, said sections being adjusted to a selected one of a plurality of relative axial positions at any one of which resonance in said sections of cylindrical wave guide to at least one of said modes of oscillation is inhibited.

10. In a rectangular wave guide system adapted to transmit energy in either direction in the $TE_{01}$ mode of oscillation, a rotatable joint comprising, a pair of coaxially abutting cylindrical wave guide sections, structural means cooperating with each of said sections and positioned at the abutment to enable relative rotation of said sections about a common axis, means coupled to said sections at a predetermined distance from the respective opposite ends of said sections for exciting oscillations in the $TM_{01}$ and $TE_{11}$ modes in said sections when said means is provided with radio frequency energy in the $TE_{01}$ mode of oscillation from said rectangular wave guide system, and means positioned at the respective opposite ends of said sections for presenting a relatively high impedance to the $TE_{11}$ mode and a relatively low impedance to said $TM_{01}$ mode at said exciting means.

11. A rotatable wave guide joint comprising, a pair of coaxially abutted cylindrical wave guide sections, structural means cooperating with each of said sections and positioned at the abutment to enable relative rotation of said sections about a common axis, means coupled to said sections at a predetermined distance from the respective opposite ends of said sections for exciting axially symmetrical and axially unsymmetrical modes of oscillations in said sections when said means is provided with radio frequency energy in the form of oscillations in another mode from a connecting hollow wave guide, and means positioned at the respective opposite ends of said sections for presenting a relatively high impedance to oscillations in said unsymmetrical mode and a relatively low impedance to said symmetrical mode at said exciting means.

12. A rotatable wave guide joint comprising, a pair of coaxially abutted cylindrical wave guide sections, structural means cooperating with each of said sections and positioned at the abutment to enable relative rotation of said sections about a common axis, means coupled to said sections at a predetermined distance from the respective opposite ends of said sections for exciting axially symmetrical and axially unsymmetrical modes of oscillations in said sections when said means is provided with radio frequency energy in another mode of oscillation from a connecting rectangular wave guide, conducting closures positioned at the respective opposite ends of said sections, and means associated with said structural means for adjusting one of said sections axially to any one of a plurality of positions with respect to the other of said sections at which resonance to the axially unsymmetrical mode is inhibited.

13. A rotatable joint comprising a pair of coaxially abutted sections of cylindrical wave guide, means coupled to said sections at a predetermined distance from the respective opposite ends thereof for exciting said sections in a first mode axially symmetrical with respect to said cylindrical sections and a second mode other than a mode axially symmetrical with respect to said section when said means is provided with radio frequency energy from a connecting wave guide, means positioned at the respective opposite ends of said sections for presenting a relatively high impedance to said second mode at said exciting means and a relatively low impedance to said first mode at said exciting means, and means for adjusting one of said sections axially to any one of a plurality of preselected positions with respect to the other of said sections at which resonance to said second mode is inhibited.

14. In a rectangular wave guide system adapted to carry electrical energy in either direction in the $TE_{01}$ mode of oscillation, a rotatable joint comprising a pair of coaxially abutted cylindrical wave guide sections, structural means cooperating with each of said sections and positioned at the abutment thereof to enable relative rotation of said sections about a common axis, means coupled to said sections at points located a selected distance from the respective opposite ends of said section for receiving energy in the $TE_{01}$ mode from said rectangular wave guide and transforming said energy into the $TM_{01}$ and $TE_{11}$ modes for cylindrical wave guides, means positioned at the respective opposite ends of said sections for presenting a relatively high impedance to said $TE_{11}$ mode at said points, said points being spaced apart a distance to inhibit resonance of oscillations in said TE$_{11}$ mode within said cylindrical section.

15. Apparatus in accordance with claim 14 and means for altering the position of one of said sections axially with respect to the other of said sections to enable the selection of one of a plurality of positions at which resonance of oscillation in said TE$_{11}$ mode energy in said joint is inhibited.

WILLIAM M. PRESTON.

REFERENCES CITED

The following references are of record in the file of this patent:

UNITED STATES PATENTS

| Number | Name | Date |
|---|---|---|
| 2,407,318 | Mieher | Sept. 10, 1946 |
| 2,433,011 | Zaleski | Dec. 23, 1947 |
| 2,513,205 | Roberts | June 27, 1950 |

OTHER REFERENCES

"Transmission Lines, Antennas and Wave Guides," by King et al., 1st edition, fourth impression, copyright 1945, by McGraw Hill.

"Principles of Radar," by M. I. T. Radar school staff, 2nd edition, copyright 1946, by McGraw Hill.